(12) United States Patent
Masuda et al.

(10) Patent No.: US 9,802,485 B2
(45) Date of Patent: Oct. 31, 2017

(54) DISPLAY APPARATUS FOR USE IN VEHICLE

(71) Applicant: YAZAKI CORPORATION, Tokyo (JP)

(72) Inventors: Hiroshi Masuda, Shizuoka (JP); Yoshiyuki Furuya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 101 days.

(21) Appl. No.: 14/886,569

(22) Filed: Oct. 19, 2015

(65) Prior Publication Data

US 2016/0039287 A1 Feb. 11, 2016

Related U.S. Application Data

(63) Continuation of application No. PCT/JP2014/061531, filed on Apr. 24, 2014.

(30) Foreign Application Priority Data

Apr. 26, 2013 (JP) .................................. 2013-093370

(51) Int. Cl.
  *G09G 5/00* (2006.01)
  *B60K 35/00* (2006.01)
  *G02B 27/01* (2006.01)
  *B60K 37/02* (2006.01)

(52) U.S. Cl.
  CPC .............. *B60K 35/00* (2013.01); *B60K 37/02* (2013.01); *G02B 27/0101* (2013.01);
  (Continued)

(58) Field of Classification Search
  CPC .............. G02B 27/0101; G02B 27/017; G02B 27/0172; G02B 27/0176; G02B 2027/013; G02B 2027/0118; G02B 2027/0165
  See application file for complete search history.

(56) References Cited

U.S. PATENT DOCUMENTS 6,985,073 B1 *  1/2006  Doan .................... B60Q 1/525
                                          340/425.5
8,854,633 B2 * 10/2014  Laffargue ............... G01F 17/00
                                          250/559.21
(Continued)

FOREIGN PATENT DOCUMENTS

DE          2 318 732 A1   11/1974
DE    10 2005 035 645 A1    2/2006
(Continued)

OTHER PUBLICATIONS

JP 2003-226161 A Translation.*
(Continued)

*Primary Examiner* — Vijay Shankar
(74) *Attorney, Agent, or Firm* — Kenealy Vaidya LLP

(57) ABSTRACT

The present invention provides a display apparatus for use in a vehicle that prevents reduction in driver visibility and adds no constrains to vehicle interior design. The display apparatus includes an indicator unit and a reflection receiving surface. The indicator unit includes a housing, an indicator accommodated in the housing, and a face glass sheet attached to the housing in such a manner that the indicator is visible. The reflection receiving surface receives light traveling from an eye range and reflecting off the face glass sheet. the face glass sheet is formed into a cross-sectional concavity depressed toward the indicator. The concavity provides a curved surface that reflects the light from the eye range to the reflection receiving surface. The reflection receiving surface is a back surface of a vehicle structure placed at a position at which there is space between the reflection receiving surface and the face glass sheet.

13 Claims, 7 Drawing Sheets

(52) U.S. Cl.
CPC ............................ *B60K 2350/206* (2013.01);
*B60K 2350/2052* (2013.01); *B60K 2350/2086*
(2013.01); *G02B 2027/013* (2013.01);
*G02B 2027/0118* (2013.01);
*G02B 2027/0165* (2013.01)

(56) References Cited

U.S. PATENT DOCUMENTS 8,915,631 B2 * 12/2014 Pastrick .............. B60Q 1/2665
362/494
2014/0002828 A1 * 1/2014 Laffargue ................ G01F 17/00
356/627

FOREIGN PATENT DOCUMENTS

| DE | 10 2012 023 941 A1 | 6/2014 |
|---|---|---|
| GB | 1 452 403 A | 10/1976 |
| JP | 6-61562 U | 8/1994 |
| JP | 2003-226161 A | 8/2003 |
| JP | 2004-257791 A | 9/2004 |
| JP | 2010-215193 A | 9/2010 |
| JP | 2014-91457 A | 5/2014 |

OTHER PUBLICATIONS

Japanese Office Action for the related Japanese Patent Application No. 2013-093370 dated Jun. 8, 2016.
German Office Action for the related German Patent Application No. 11 2014 002 146.6 dated Jan. 26, 2017.
International Search Report and Written Opinion for PCT Patent App. No. PCT/JP2014/061531 (dated Aug. 5, 2014) with English translation of the Search Report.

* cited by examiner

DISPLAY APPARATUS FOR USE IN VEHICLE

TECHNICAL FIELD

The present invention relates to a display apparatus for use in a vehicle.

BACKGROUND ART

Vehicles are typically equipped with a display apparatus for use in a vehicle to display measurements, such as vehicle speed and engine rpm. Such a display apparatus for use in a vehicle includes a meter case that houses a dial including on its surface a scale and an index, such as numerals, characters, or symbols, a pointer placed on the front of the dial, an internal mechanism to actuate the pointer in accordance with measured quantities, and a wiring board on which a circuit pattern is arranged and the internal mechanism is fixed.

A conventional display apparatus for use in a vehicle is accommodated in an instrument panel of a vehicle with the surface of a meter such as the dial covered with a face glass sheet. A face glass sheet of the type employed in such a conventional display apparatus for use in a vehicle is problematic in that, when used in a flat shape and placed perpendicularly to a driver, reflections of the clothing and face of the driver in the face glass sheet cause the indicator arranged beyond the face glass sheet to be less visible.

FIG. 9 is an explanatory diagram illustrating an example of a conventional display apparatus for use in a vehicle having a configuration typically employed to solve such a problem. With reference to FIG. 9, to prevent reflections of a person or the lower side in a face glass sheet 200, which is positioned before an indicator 100, and to prevent extraneous light from reflecting off the face glass sheet 200 to become visible when the indicator 100 is viewed from an eye point EP, a hood shaped structure or a meter hood 900 is provided in such a manner that the reflection off the surface of the face glass sheet 200 converges on a back surface of the hood 900 and thereby the visibility of the indicator 100 is ensured. This is problematic, however, in that the need for the meter hood 900 affects the degree of design freedom.

FIG. 10 is an explanatory diagram illustrating another example of a conventional display apparatus for use in a vehicle. With reference to FIG. 10, the display apparatus is designed such that the reflection off the surface of a face glass sheet 200 is downward when an indicator 100 is viewed from the eye point, and thereby the reflected light off the face glass sheet 200 converges on a dark reflection receiving surface 600a provided on an instrument panel 600 to ensure the visibility of the indicator 100. This is, however, also problematic in that the need to provide the dark reflection receiving surface 600a at a position that is on the surface of the instrument panel 600 and visible to an occupant affects the degree of design freedom.

A display apparatus for use in a vehicle having a configuration to solve such problems is disclosed in Patent Literature 1. As illustrated in FIG. 11, the display apparatus for use in a vehicle includes an indicator 100 housed in an instrument panel 600 of a vehicle 50, a face glass sheet 200 disposed between the indicator 100 and a driver of the vehicle 500 in such a manner that the indicator 100 is visible to the driver, and a dark ceiling portion 300 formed in a ceiling 700 inside the vehicle 500 at a position toward the front of a driver seat 800 of the vehicle 50. The face glass sheet 200 has a concave section in the longitudinal direction of the vehicle 500, with the concave surface directed to the driver side from an edge of the instrument panel 600. The face glass sheet 200 includes a reflection portion 210 that reflects light L from an eye range ER of the vehicle 50 to the dark ceiling portion 300 so that the reflection of the dark ceiling portion 300 is in the reflection portion 210.

With the display apparatus for use in a vehicle having the structure described above, the light from the eye range ER of the vehicle 500 is reflected off the surface of the face glass sheet 200 and the surface reflected light travels toward the dark ceiling portion 300 provided inside the vehicle. Thus, the surface reflected light allows the reflection of the dark ceiling portion 300 to be in the reflection portion 25 of the face glass sheet 200. Placing the dark ceiling portion 300 at the position toward the front of the driver seat can also prevent the reflections of the face and the like of the driver in the reflection portion 210.

CITATION LIST

Patent Literature

Patent Literature 1: JP 2010-215193 A

SUMMARY OF INVENTION

Technical Problem

The display apparatus for use in a vehicle disclosed in Patent Literature 1, however, requires the dark ceiling portion 300 to have a large area because the long distance between the face glass sheet 200 and the dark ceiling portion 300 providing the reflection receiving surface causes a reflection receiving surface to move significantly in relation to the movement of the viewpoint. The large area may allow extraneous light to enter the reflection receiving surface and the reflected extraneous light to be in the eye of the driver, leading to reduction in visibility of the indicator to the driver. Additionally, it poses a problem that constraints are added to the degree of design freedom for the design of the ceiling.

The present invention has been achieved in view of the above and an object of the present invention is to provide a display apparatus for use in a vehicle that prevents reduction in driver visibility and adds no constraints on the vehicle interior design.

Solution to Problem

To achieve the above-describe object, in an aspect of the invention described in a first aspect, a display apparatus for use in a vehicle is provided, the apparatus including an indicator unit including; a housing, an indicator accommodated in the housing, and a face glass sheet attached to the housing in such a manner that the indicator is visible; and a reflection receiving surface configured to receive light traveling from an eye range and reflecting off the face glass sheet, wherein the face glass sheet is formed into a cross-sectional concavity depressed toward the indicator, the concavity providing a curved surface that reflects the light from the eye range to the reflection receiving surface, wherein the reflection receiving surface is a back surface of a vehicle structure placed at a position at which there is space between the reflection receiving surface and the face glass sheet and at which the reflection receiving surface is close to the face glass sheet and is invisible to a driver in a driver seat.

In an aspect of the invention described in a second aspect, the display apparatus for use in a vehicle according to the aspect of the invention described in the first aspect is provided, wherein the vehicle structure is one of a register, a reinforcement, an instrument panel belt line, and a support device for the indicator unit.

In an aspect of the invention described in a third aspect, the display apparatus for use in a vehicle according to the aspect of the invention according to the second aspect is provided, wherein the reflection receiving surface is at a position in a vertical direction approximately in a middle of the face glass sheet in the vertical direction.

In an aspect of the present invention described in a fourth aspect, the display apparatus for use in a vehicle according to the aspect of the invention according to any one of aspects is provided, wherein an ambient lighting unit is placed on the reflection receiving surface.

In an aspect of the present invention described in fifth aspect, the display apparatus for use in a vehicle according to the aspect of the invention according to any one of aspects is provided, wherein one of a head-up display indicator and an external viewing indicator is attached to a windshield side of the indicator unit toward.

Advantageous Effects of Invention

As described above, in an aspect of the invention described in the first aspect, a display apparatus for use in a vehicle is provided, the apparatus including: an indicator unit including a housing, an indicator accommodated in the housing, and a face glass sheet attached to the housing in such a manner that the indicator is visible; and a reflection receiving surface configured to receive light traveling from an eye range and reflecting off the face glass sheet, wherein the face glass sheet is formed into a cross-sectional concavity depressed toward the indicator, the concavity providing a curved surface that reflects the light from the eye range to the reflection receiving surface, wherein the reflection receiving surface is a back surface of a vehicle structure placed at a position at which there is space between the reflection receiving surface and the face glass sheet and at which the reflection receiving surface is close to the face glass sheet and is invisible to a driver in a driver seat; thus, the light from the eye range reflects off the face glass sheet and converges on the reflection receiving surface, which is, for example, the back surface of the vehicle structure close to the face glass sheet. This prevents reflections of a person, the outside, and extraneous light in the face glass sheet, thereby providing the display apparatus for use in a vehicle, which prevents reduction in driver visibility and adds no constraints on the vehicle interior design.

In the display apparatus for use in a vehicle according to an aspect of the invention described in the second aspect, the vehicle structure is one of a register, a reinforcement, an instrument panel belt line, and a support device for the indicator unit; thus, in addition to the effects of the aspect of the invention according to the first aspect, the invention can be achieved inexpensively without providing no special article as the reflection receiving surface.

In the display apparatus for use in a vehicle according to an aspect of the invention described in the third aspect, the reflection receiving surface is at a position in a vertical direction approximately in a middle of the face glass sheet in the vertical direction; thus, in addition of the effects of the aspect of the invention according to the second aspect, reflections in the upper and lower portions of the face glass sheet can be inhibited.

In the display apparatus for use in a vehicle according to an aspect of the invention described in the fourth aspect, an ambient lighting unit is placed at the position of the reflection receiving surface; thus, in addition to the effects of the aspect of the invention according to any one of aspects, the face glass sheet can be illuminated with ambient lighting.

In the display apparatus for use in a vehicle according to an aspect of the invention described in the fifth aspect, one of a head-up display indicator and an external viewing indicator is attached to a windshield side of the indicator unit; thus, in addition to the effects of the aspect of the invention according to any one of aspects, head-up display indication or external viewing indication can be provided simultaneously with vehicle indication.

DESCRIPTION OF EMBODIMENTS

Some embodiments of a display apparatus for use in a vehicle according to the present invention will now be described with reference to FIGS. 1A to 9.

First Embodiment

Figure 1A:
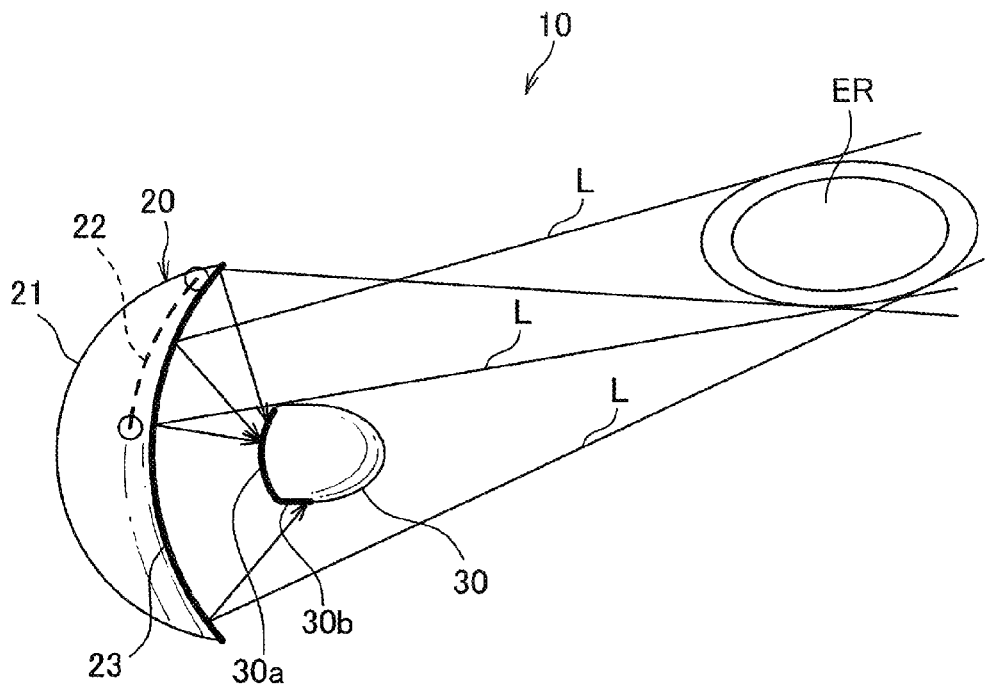
FIGS. 1A and 1B are diagrams schematically illustrating the configuration of a display apparatus for use in a vehicle according to a first embodiment of the invention, with FIG. 1A being a side view and FIG. 1B being a top view.
Figure 1B:
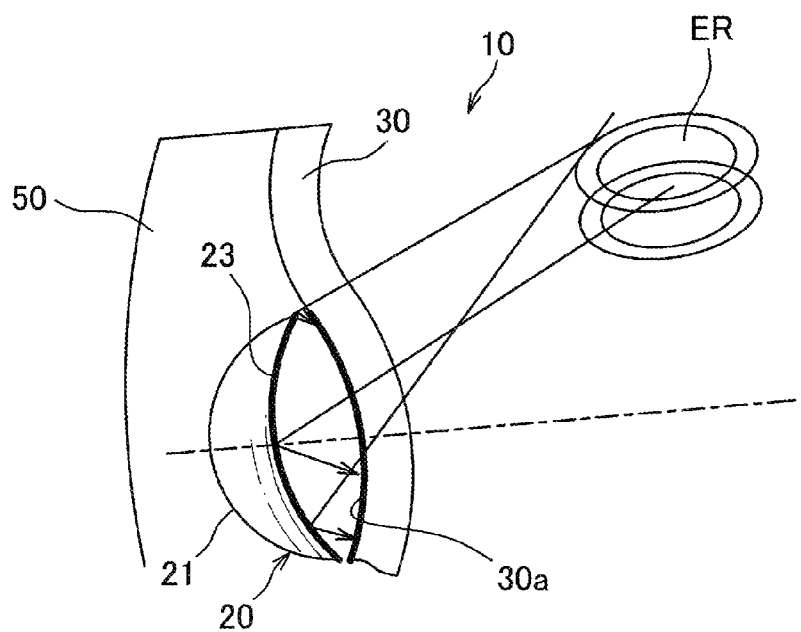
Figure 2A:
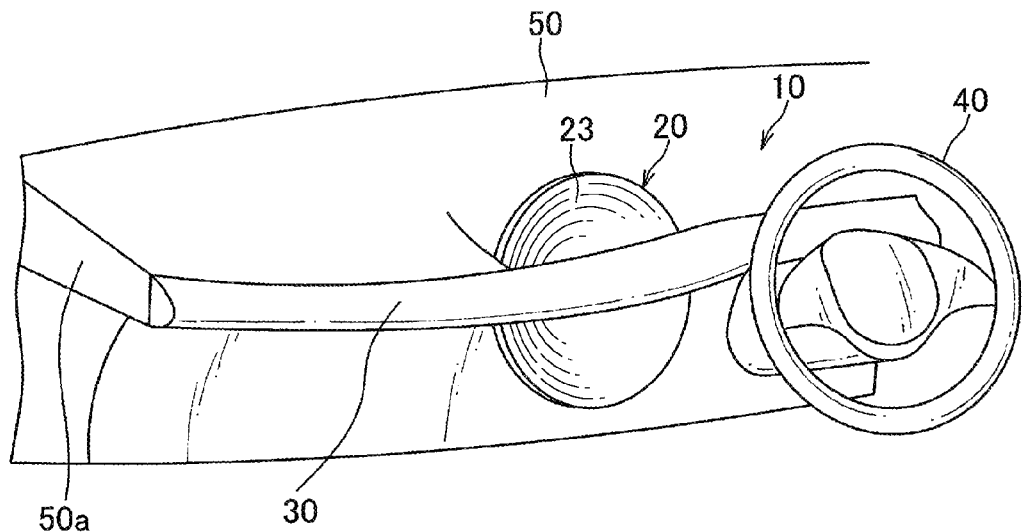
FIGS. 2A and 2B are configuration diagrams illustrating the configuration of the display apparatus for use in a vehicle according to the first embodiment of the invention, with FIG. 2A being a perspective view and FIG. 2B being a schematic sectional view.
Figure 2B:
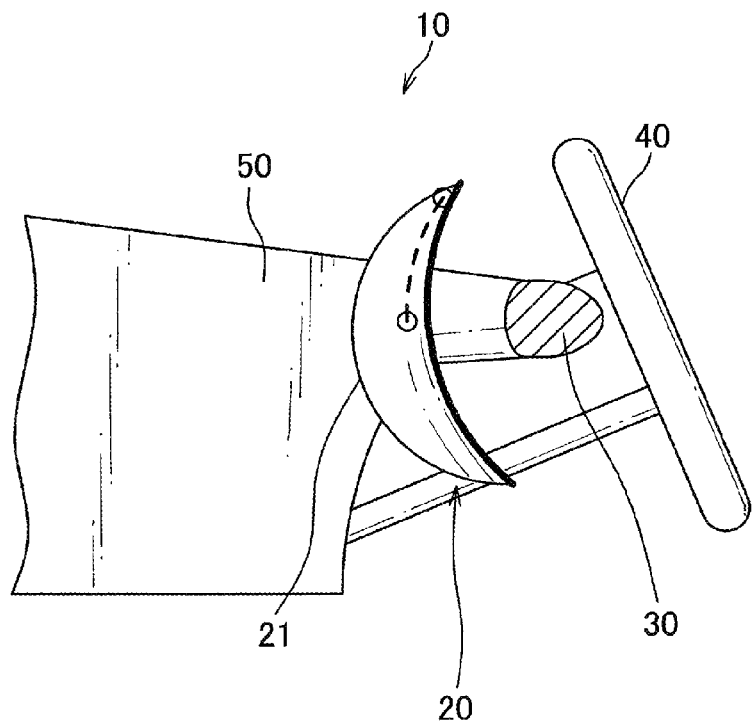

FIGS. 1A and 1B are diagrams schematically illustrating the configuration of a display apparatus for use in a vehicle according to a first embodiment of the invention, with FIG. 1A being a side view and FIG. 1B being a top view. FIGS. 2A and 2B are configuration diagrams illustrating the configuration of the display apparatus for use in a vehicle according to the first embodiment of the invention, with FIG. 2A being a perspective view and FIG. 2B being a side view.

With reference to FIGS. 1A and 1B, a display apparatus 10 for use in a vehicle includes an indicator unit 20 placed at an appropriate position in a vehicle (which is between an instrument panel [hereinafter referred to as IP] 50 and a driver seat, and it is at a position diagonally in front of the driver seat in the present embodiment). The indicator unit 20 includes a housing 21, an indicator 22 accommodated in the housing 21, and a face glass sheet 23 attached to the housing 21 in such a manner that the indicator 22 is visible to a driver. As illustrated in FIGS. 2A and 2B, the indicator unit 20 is fixed to the IP 50 and arranged in such a manner that there is space between the indicator unit 20 and an IP belt line 30. The IP belt line 30 is attached to an end of an extension 50a extending from the IP 50 and is formed so as to pass between the IP 50 and a steering wheel 40.

The indicator 22 may have different forms, such as an analog meter, a liquid crystal indicator, or a combination of an analog meter and a liquid crystal indicator, depending on the vehicle design and other factors.

The face glass sheet 23 is formed of a transparent or smoked transparent body, such as acrylic resin. The face glass sheet 23 has a shape that penetrates the instrument panel 50 and has a section forming a concavity having a depression toward the inside of the housing 21 (i.e., toward the indicator 22). The concavity in its entirety provides a curved surface (for example, a cubic surface) that reflects light from a driver eye range ER toward a reflection receiving surface. Like a concave mirror, the face glass sheet can converge the reflection region of the light from the driver eye range, resulting in reduction in area of the reflection receiving surface.

As illustrated in FIGS. 1A and 1B, for example, the reflection receiving surface includes a back surface 30a and a lower surface 30b of the IP belt line 30. The back surface 30a and the lower surface 30b of the IP belt line 30 are placed at (floating) positions at which there is space between these surfaces and the face glass sheet and at which these surfaces are close to the face glass sheet 23 and are invisible to the driver in the driver seat. The back surface 30a and the lower surface 30b are non-design portions and their positions in a vertical direction are approximately in the middle of the face glass sheet 23 in the vertical direction. The reflection receiving surface is preferably dark in color. Providing the reflection receiving surface close to the face glass sheet 23 in this manner enables prevention of reflections in a wide area.

The concavity of the face glass sheet 23 allows the light from the reflection receiving surface, more specifically, the back surface 30a of the IP belt line 30, or the back surface 30a and the lower surface 30b thereof, to reflect off the face glass sheet 23 and reach the driver eye range ER.

This prevents reflections of a person, the outside, and extraneous light in the face glass sheet 23 and enables a reflection of the reflection receiving surface in the face glass sheet 23 when the driver looks at the indicator 22, thereby preventing reduction in visibility of the indicator 22. Additionally, the reflection receiving surface, which is not specially provided but available on a structure of a vehicle, adds no constrains on the vehicle interior design.

An exemplary operation of the display apparatus 1 for use in a vehicle will now be described with reference to FIGS. 1A, 1B, 2A, and 2B.

In the display apparatus 1 for use in a vehicle, as the light L travels from inside the driver eye range ER of the vehicle to the face glass sheet 23, a part of the light L passes through the face glass sheet 23 to reach the indicator 10. Thus, the light that has reached the indicator 10 allows the driver to see the indication of the indicator 10.

The light L that travels from the eye range ER to the face glass sheet 20 is reflected off the face glass sheet 23, and the reflected light travels toward the back side 30a of the IP belt line 30, or the back side 30a and the lower side 30b thereof. The reflected light that has reached the back side 30a of the IP belt line 30, or the back side 30a and the lower side 30b thereof, allows the driver to see the back side 30a of the IP belt line 30, or the back side 30a and the lower side 30b thereof.

In the display apparatus 1 for use in a vehicle described above, the face glass sheet 23 is formed so as to reflect the light L from the driver eye range ER in a vehicle to the reflection receiving surface placed between the IP 50 and the driver seat inside the vehicle (a surface that includes a back surface and a lower surface of a structure and the like of the vehicle and that is invisible to a driver in the driver seat), so that a reflection of the reflection receiving surface placed between the IP 50 and the driver seat inside the vehicle is in the face glass sheet 23. In this manner, the problem can be solved that reflections of the clothing and face of the driver in the face glass sheet 20 causes the indicator 22 placed beyond the face glass sheet 23 to be less visible. The face glass sheet 23, which has a concavity having a depression toward the indicator 22, has a curved surface (for example, a cubic surface) that reflects the light from the driver eye range ER to the reflection receiving surface and thus eliminates a reflection of extraneous light in the face glass sheet 23. This allows elimination of a conventional meter hood from the IP 30 and thereby elimination of dark hole feel generated conventionally.

Second Embodiment

Figure 3:
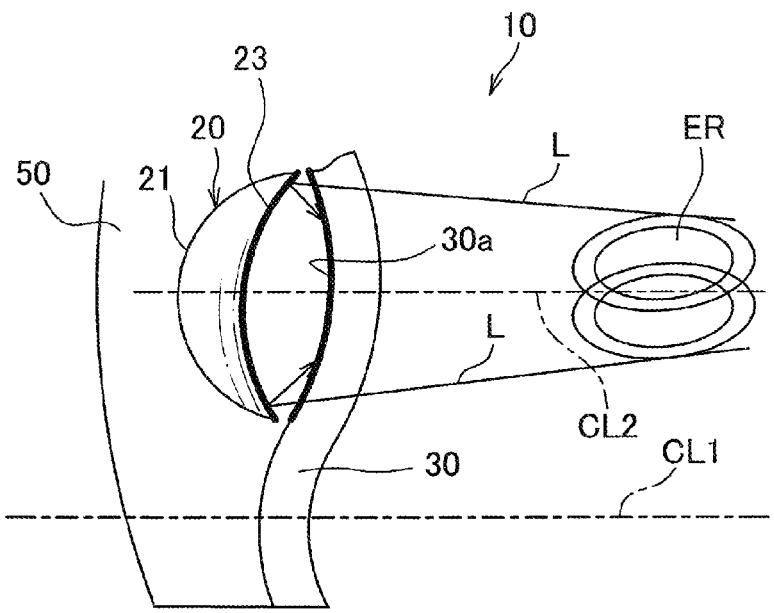
FIG. 3 is a top view schematically illustrating the configuration of a display apparatus for use in a vehicle according to a second embodiment of the invention.

FIG. 3 is a top view schematically illustrating the configuration of a display apparatus for use in a vehicle according to a second embodiment of the invention. While the indicator unit 20 in the first embodiment illustrated in FIGS. 1A and 1B is diagonally in front of the driver seat (for example, on a vehicle center line CL1), an indicator unit 20 according to the third embodiment is right in front of a driver (on a driver center line CL2). In other words, the indicator unit 20 may be placed at any position, such as at the center of a vehicle and in front of a driver.

Third Embodiment

Figure 4A:
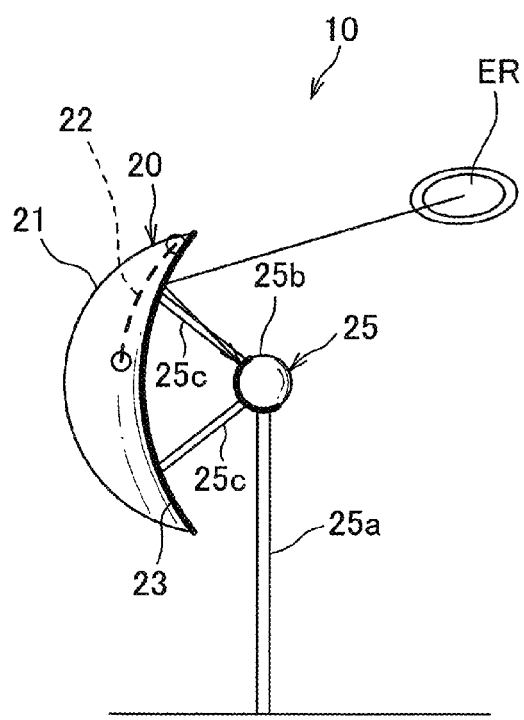
FIGS. 4A and 4B are configuration diagrams schematically illustrating the configuration of a display apparatus for use in a vehicle according to a third embodiment of the invention, with FIG. 4A being a side view and FIG. 4B being a front view.
Figure 4B:
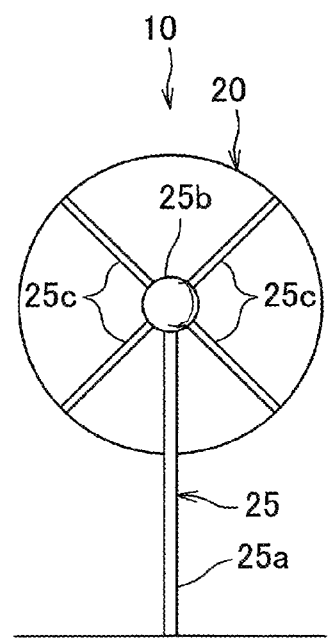

FIGS. 4A and 4B are configuration diagrams schematically illustrating the configuration of a display apparatus for use in a vehicle according to a third embodiment of the invention, with FIG. 4A being a side view and FIG. 4B being a front view. In FIGS. 4A and 4B, a support 25 is illustrated, which is an exemplary support for supporting an indicator unit 20 at an appropriate position in a vehicle. The support 25 is made of, for example, synthetic resin and includes a pole 25a, a supporting body 25b, and supporting rods 25c. The pole 25a extends perpendicularly with one end thereof fixed to a position on a floor surface between an IP 50 and a driver seat inside the vehicle. The supporting body 25b is, for example, a spherical component attached to the other end of the pole 25a. The supporting rods 25c extend radially from the supporting body 25b and have ends that support the indicator unit 20 by fixing means, such as bonding and locking with locking pieces. The supporting body 25b has a surface that is invisible to a driver and functions as a reflection receiving surface that receives the light traveling from a driver eye range ER and reflecting off a window glass sheet 23.

Fourth Embodiment

Figure 5A:
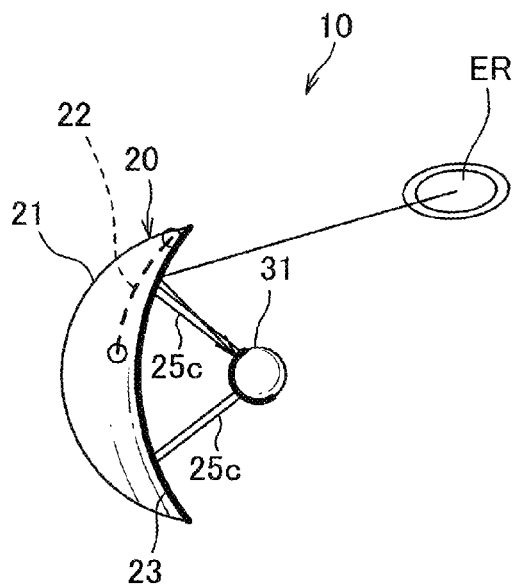
FIGS. 5A and 5B are configuration diagrams schematically illustrating the configuration of a display apparatus for use in a vehicle according to a fourth embodiment of the invention, with FIG. 5A being a side view and FIG. 5B being a front view.
Figure 5B:
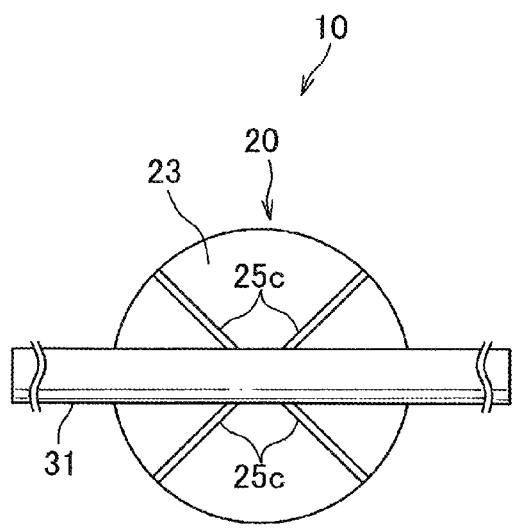

FIGS. 5A and 5B are configuration diagrams schematically illustrating the configuration of a display apparatus for use in a vehicle according to a fourth embodiment of the invention, with FIG. 5A being a side view and FIG. 5B being a front view. In FIGS. 5A and 5B, a tubular or cylindrical reinforcement 31 is illustrated, which also serves as a support for supporting an indicator unit 20 at an appropriate position inside a vehicle. Supporting rods 25c are added to the reinforcement 31 in such a manner that the supporting rods 25c extend radially from the reinforcement 31. The supporting rods 25c have ends that support the indicator unit 20 by fixing means, such as bonding and locking with locking pieces. The reinforcement 31 has an outer peripheral surface that is invisible to a driver and can function as a reflection receiving surface that receives the light traveling from a driver eye range ER and reflecting off a window glass sheet 23.

With the third and fourth embodiments, the visibility of the indicator 22 can be ensured even in a vehicle equipped with no IP, such as a compact mobility vehicle and an electric vehicle.

Fifth Embodiment

Figure 6:
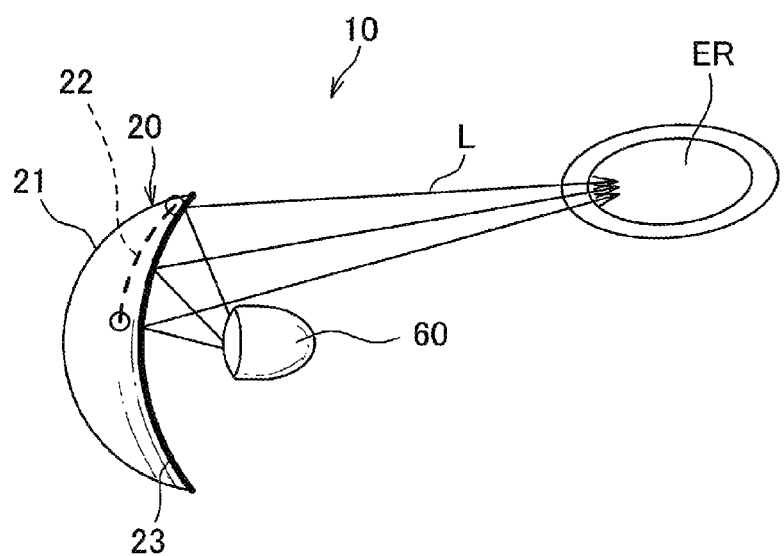
FIG. 6 is a side view schematically illustrating a display apparatus for use in a vehicle according to a fifth embodiment of the invention.

FIG. 6 is a side view schematically illustrating the configuration of a display apparatus for use in a vehicle according to a fifth embodiment of the invention. The fifth embodiment includes an ambient lighting unit 60, which is placed at a position of a reflection receiving surface. This allows all or part of a face glass sheet to be illuminated. Additionally, the ambient lighting can placed at a position invisible to and hidden from a driver.

Sixth Embodiment

Figure 7:
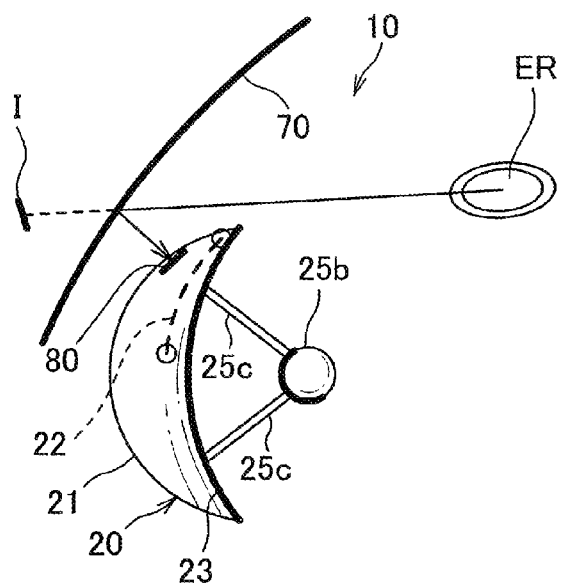
FIG. 7 is a side view schematically illustrating the configuration of a display apparatus for use in a vehicle according to a sixth embodiment of the invention.

FIG. 7 is a side view schematically illustrating the configuration of a display apparatus for use in a vehicle according to a sixth embodiment of the invention. The sixth embodiment includes an indicator unit 20, which is placed close to a windshield 700 of a vehicle, and a head-up display (HUD) indicator 80, which is placed on the back side of the indicator unit 20, more specifically on either the outer side or the inner side of a housing 21. Placing the HUD indicator 80 on the inner side of the housing 21 involves a window provided in the housing 21 to allow the light from a screen of the HUD indicator 80 to pass therethrough to the outside.

The light from the screen of the HUD indicator 80 reflects off the windshield 70 of the vehicle to reach the inside of the driver eye range ER. This allows the screen of the HUD indicator unit 80 to be visible as a virtual image I in a front visual field that is seen through the windshield 70.

The present embodiment provides a HUD indication with good visibility and is feasible even in a compact mobility vehicle, which has a small interior space and requires a display apparatus for use in a vehicle and a windshield to be placed close to each other, and a one-box vehicle, which has a small depth for a windshield and thus its angle is sharp.

Seventh Embodiment

Figure 8:
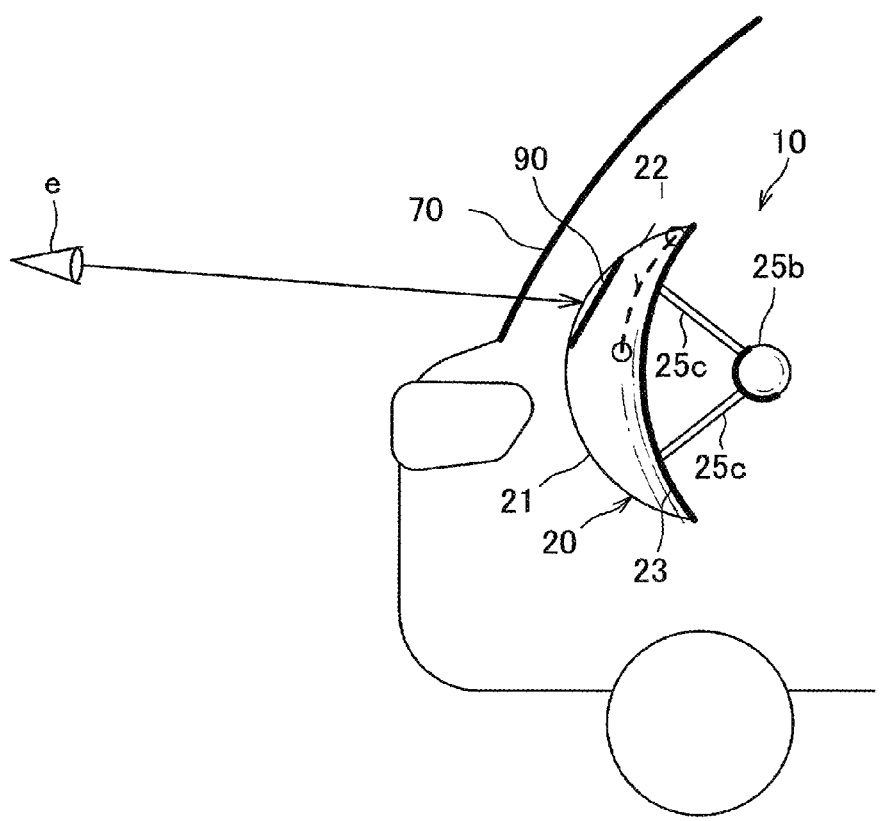
FIG. 8 is a side view schematically illustrating the configuration of a display apparatus for use in a vehicle according to a seventh embodiment of the invention.
Figure 9:
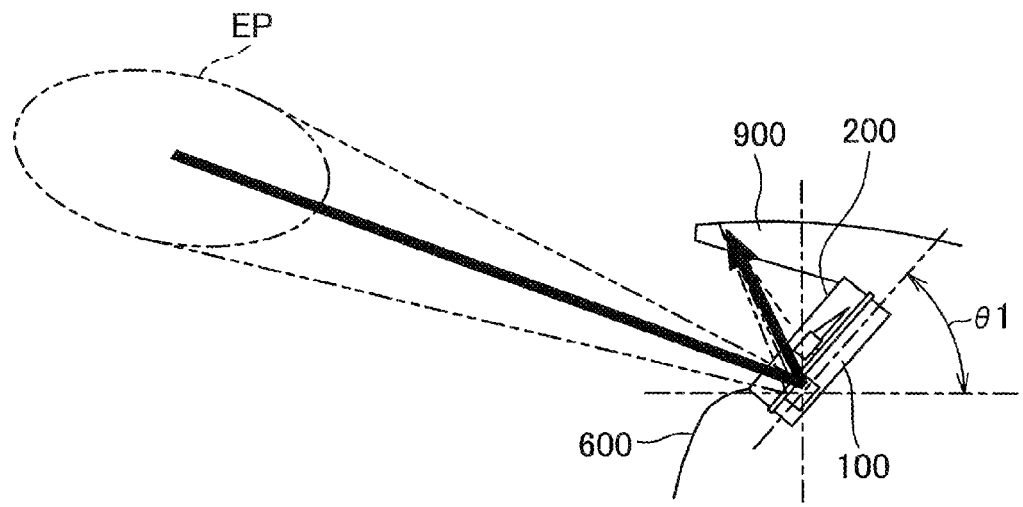
FIG. 9 is an explanatory diagram schematically illustrating an example of the configuration of a conventional display apparatus for use in a vehicle.
Figure 10:
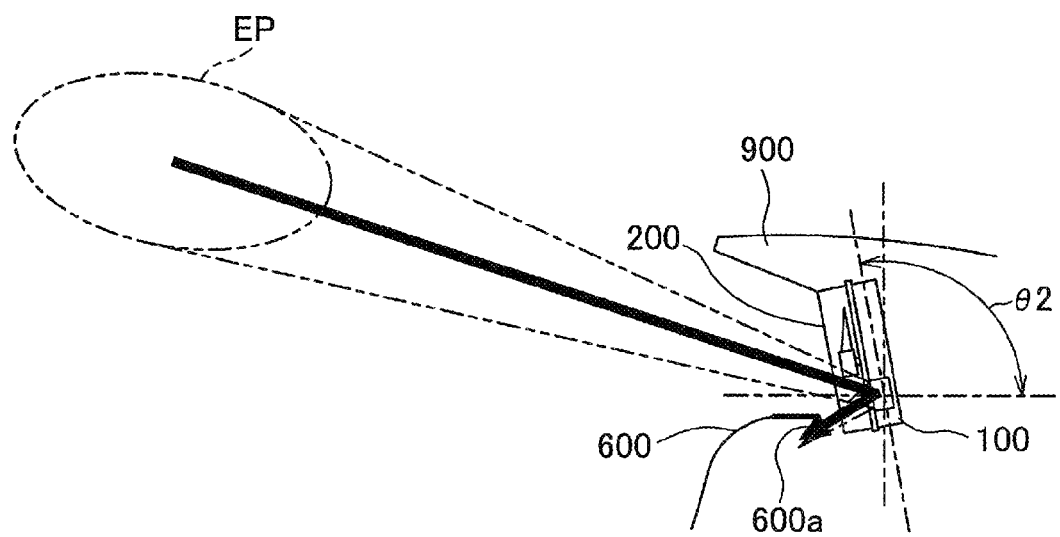
FIG. 10 is an explanatory diagram schematically illustrating another example of the configuration of a conventional display apparatus for use in a vehicle.
Figure 11:
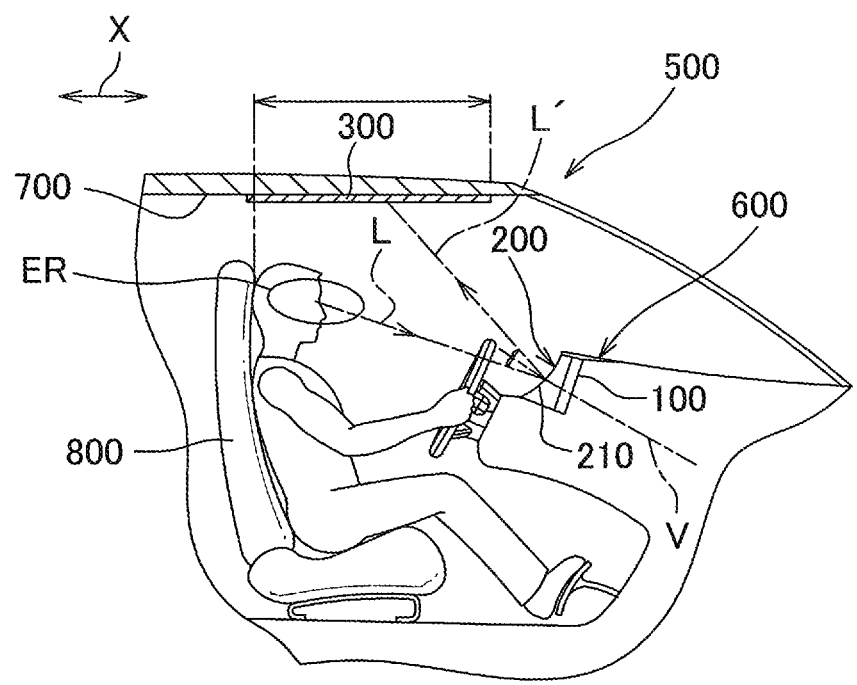
FIG. 11 is a configuration diagram schematically illustrating an example configuration of a conventional (Patent Literature 1) display apparatus for use in a vehicle.

FIG. 8 is a side view schematically illustrating the configuration of a display apparatus for use in a vehicle according to a seventh embodiment of the invention. The seventh embodiment includes an indicator unit 20, which is placed close to a windshield 70 of a vehicle, and an external indicator 90, which is placed on the back side of the indicator unit 20, more specifically on either the outer side or the inner side of a housing 21. Placing the external indicator 90 on the inner side of the housing 21 involves a window provided in the housing 21 to allow the light from a screen of the external indicator 90 to pass therethrough to the outside.

The external indicator 90 is visible directly from the outside (for example, a viewpoint e) through the windshield 70. This allows the external indicator 90 to be used as a message board to pedestrians and other vehicles. For example, a novice driver symbol or an elderly driver symbol can be displayed in the external indicator 90.

The embodiments described above merely present representative examples of the invention, and the invention is not limited to the embodiments. It is therefore possible to make various modifications without departing from the spirit of the invention.

REFERENCE SIGNS LIST

10 Display apparatus for use in vehicle
20 Indicator unit
21 Housing
22 Indicator
23 Face glass sheet
30 IP belt line
30a Back surface of IP belt line (reflection receiving surface)
30b lower surface of IP belt line (reflection receiving surface)
50 Instrument panel (IP)
60 Ambient lighting unit
70 Windshield
80 HUD indicator
90 External indicator
ER Driver eye range

The invention claimed is:

1. A display apparatus for use in a vehicle, the apparatus comprising:
    an indicator unit including a housing, an indicator accommodated in the housing, and a face glass sheet attached to the housing in such a manner that the indicator is visible; and
    a reflection receiving surface configured to receive light traveling from an eye range and reflecting off the face glass sheet, wherein
    the face glass sheet is formed into a cross-sectional concavity depressed toward the indicator, the concavity providing a curved surface that reflects the light from the eye range to the reflection receiving surface, wherein
    the reflection receiving surface is a back surface of a vehicle structure placed at a position at which there is space between the reflection receiving surface and the face glass sheet and at which the reflection receiving surface is close to the face glass sheet and is invisible to a driver in a driver seat, and wherein the indicator unit is fixed to an instrument panel in a vehicle in such a manner that the face glass sheet penetrates the instrument panel in a vertical direction and upper and lower portions of the curved surface protruding from the instrument panel both reflect the light from the eye range to the reflection receiving surface.

2. The display apparatus for use in a vehicle according to claim 1, wherein the vehicle structure is one of a register, a reinforcement, an instrument panel belt line, and a support device for the indicator unit.

3. The display apparatus for use in a vehicle according to claim 2, wherein the reflection receiving surface is at a position in the vertical direction approximately in a middle of the face glass sheet in the vertical direction.

4. The display apparatus for use in a vehicle according to claim 1, wherein an ambient lighting unit is placed on the reflection receiving surface.

5. The display apparatus for use in a vehicle according to claim 2, wherein an ambient lighting unit is placed on the reflection receiving surface.

6. The display apparatus for use in a vehicle according to claim 3, wherein an ambient lighting unit is placed on the reflection receiving surface.

7. The display apparatus for use in a vehicle according to claim 1, wherein one of a head-up display indicator and an external viewing indicator is attached to a windshield side of the indicator unit.

8. The display apparatus for use in a vehicle according to claim 2, wherein one of a head-up display indicator and an external viewing indicator is attached to a windshield side of the indicator unit.

9. The display apparatus for use in a vehicle according to claim 3, wherein one of a head-up display indicator and an external viewing indicator is attached to a windshield side of the indicator unit.

10. The display apparatus for use in a vehicle according to claim 4, wherein one of a head-up display indicator and an external viewing indicator is attached to a windshield side of the indicator unit.

11. The display apparatus for use in a vehicle according to claim 5, wherein one of a head-up display indicator and an external viewing indicator is attached to a windshield side of the indicator unit.

12. The display apparatus for use in a vehicle according to claim 6, wherein one of a head-up display indicator and an external viewing indicator is attached to a windshield side of the indicator unit.

13. The display apparatus for use in a vehicle according to claim 1, wherein a reflection receiving surface overlaps a portion of the face glass sheet.

* * * * *